United States Patent [19]

Shindo et al.

[11] 4,129,051
[45] Dec. 12, 1978

[54] OIL PRESSURE CONTROL MEANS FOR AN AUTOMATIC TRANSMISSION

[75] Inventors: Yoshio Shindo; Hiroshi Ito, both of Toyota, Japan

[73] Assignee: Toyota Jidosha Kogyo Kabushiki Kaisha, Toyota, Japan

[21] Appl. No.: 791,575

[22] Filed: Apr. 27, 1977

[30] Foreign Application Priority Data

Dec. 27, 1976 [JP] Japan ................................. 51/159179

[51] Int. Cl.² .............................................. B60K 41/10
[52] U.S. Cl. ...................................................... 74/867
[58] Field of Search .................................. 74/866, 867

[56] References Cited

U.S. PATENT DOCUMENTS

| | | | |
|---|---|---|---|
| 3,951,011 | 4/1976 | Lemon | 74/867 |
| 4,056,991 | 11/1977 | Kagenori et al. | 74/867 |

*Primary Examiner*—Benjamin W. Wyche
*Assistant Examiner*—Frank H. McKenzie, Jr.
*Attorney, Agent, or Firm*—Stevens, Davis, Miller & Mosher

[57] ABSTRACT

An oil pressure control means for an automatic transmission including an overdrive means of a planetary gear type having a plurality of friction engaging means and a one-way clutch and adapted to allow the output shaft thereof to run over the input shaft thereof due to the disengagement of the one-way clutch in the reversed rotational direction thereof when one of the friction engaging means arranged in parallel to the one-way clutch is disengaged, wherein an oil pressure change over means is included which drains the oil pressure for the aforementioned one friction engaging means of the overdrive means when the downshifting of the transmission is effected, thereby allowing the output shaft of the overdrive means to run over the input shaft thereof so that the occurrence of the engine braking is avoided.

6 Claims, 8 Drawing Figures

(a)

TRANSITION OF OIL PRES. IN THE PASSAGE FOR BRAKE 26

OIL PRES. IN PORT 97
OIL PRES. IN PORT 98
A: SHIFTING PERIOD OF PISTON 26

(b)

OIL PRES. OF CLUTCH 12 IN 2ND EMBODIMENT

B: RELEASED PERIOD OF CLUTCH 12

CLUTCH 25
BRAKE 26

OIL PRESSURE CONTROL MEANS FOR AN AUTOMATIC TRANSMISSION

BACKGROUND OF THE INVENTION

1. Field of the Invention:

The present invention relates to an oil pressure control means for an automatic transmission for automobiles and, more particularly, an improvement of an oil pressure control means for an automatic transmission for automobiles for improving the down shift feeling of the transmission, said transmission comprising a fluid torque converter and a reduction gear means including a plurality of friction engaging means and adapted to effect various gear stages by changing over the engagement of said friction engaging means in the clutch-to-clutch mode.

2. Description of the Prior Art:

In an automatic transmission of the abovementioned type, the friction engaging means are automatically engaged or disengaged in a changing-over manner from time to time while the automobile is running in accordance with the relation between the stepping-in amount of the accelerating pedal and the vehicle speed, thereby establishing the most desirable gear stage in the reduction gear means for the instant operational condition of the vehicle. The shifting of the gear stages from one to another is generally effected in the so-called clutch-to-clutch mode wherein one of the friction engaging means which establishes a gear stage is gradually disengaged while another friction engaging means which establishes another gear stage is gradually engaged. In this clutch-to-clutch mode of changing over of the friction engaging means, it is important that the operational timing of the individual friction engaging means is properly controlled in order to effect a smooth shifting of speed and to obtain a satisfactory drive feeling. Particularly in the down shifting, if the changing over timing is not proper, a negative torque appears in the output shaft and causes a uncomfortable shift shock or, alternatively, there occurs a temporal blowing up of the engine. Conventionally, the operational timing of the friction engaging means is generally regulated by incorporating proper throttle elements and/or buffer means such as accumulators in the oil passages for supplying oil pressure to the individual friction engaging means.

SUMMARY OF THE INVENTION

The present invention contemplates to utilize the overdrive means in the automatic transmission of the type including the planetary gear overdrive means interposed between the conventional reduction gear means and the fluid torque converter for providing an improved automatic transmission having a self adjusting performance for the timing of the changing over of the friction engaging means in the downshifting.

In accordance with the present invention, in an oil pressure control means for an automatic transmission which comprises a fluid torque converter, an overdrive means of a planetary gear type, said overdrive means comprising a planetary gear mechanism, a plurality of friction engaging means and a one-way clutch and adapted to allow the output shaft thereof to run over the input shaft thereof due to the disengagement of said one-way clutch in the reverse rotational direction thereof when one of said friction engaging means arranged in parallel to said one-way clutch is disengaged, and a reduction gear means including a reduction gear mechanism and a plurality of friction engaging means and adapted to effect various gear stages, said oil pressure control means comprises a source of oil pressure, a line pressure regulating valve which generates a line pressure from the oil pressure of said source, a throttle pressure regulating valve which generates a throttle pressure corresponding to the throttle opening, a governor valve which generates a governor pressure corresponding to the vehicle speed, a manual shift valve for shifting speed ranges, a speed shift valve or valves which change over the supply of oil pressure to said friction engaging means of said reuction gear mechanism depending upon the balance of said throttle pressure and said governor pressure an overdrive control valve which changes over the supply of oil pressure to said friction engaging means of said overdrive means depending upon the balance of said throttle pressure and said governor pressure, and a change-over valve which intercepts the supply of oil pressure to said one friction engaging means of said overdrive means in response to the supply of oil pressure to one of said friction engaging means of said reduction gear means which accomplishes a low speed stage.

Or alternatively, instead of said change-over valve, the oil pressure control means of the present invention may comprise an oil passage means which exhausts oil pressure from said one friction engaging means of said overdrive means in accordance with the exhaust of oil pressure from one of said friction engaging means of said reduction gear means which accomplishes a high speed stage.

BRIEF DESCRIPTION OF THE DRAWING

The present invention will become more fully understood from the detailed description given hereinbelow and the accompanying drawings which are given by way of illustration only, and thus are not limitative of the present invention and wherein.

DESCRIPTION OF THE PREFERRED EMBODIMENT

Figure 1:
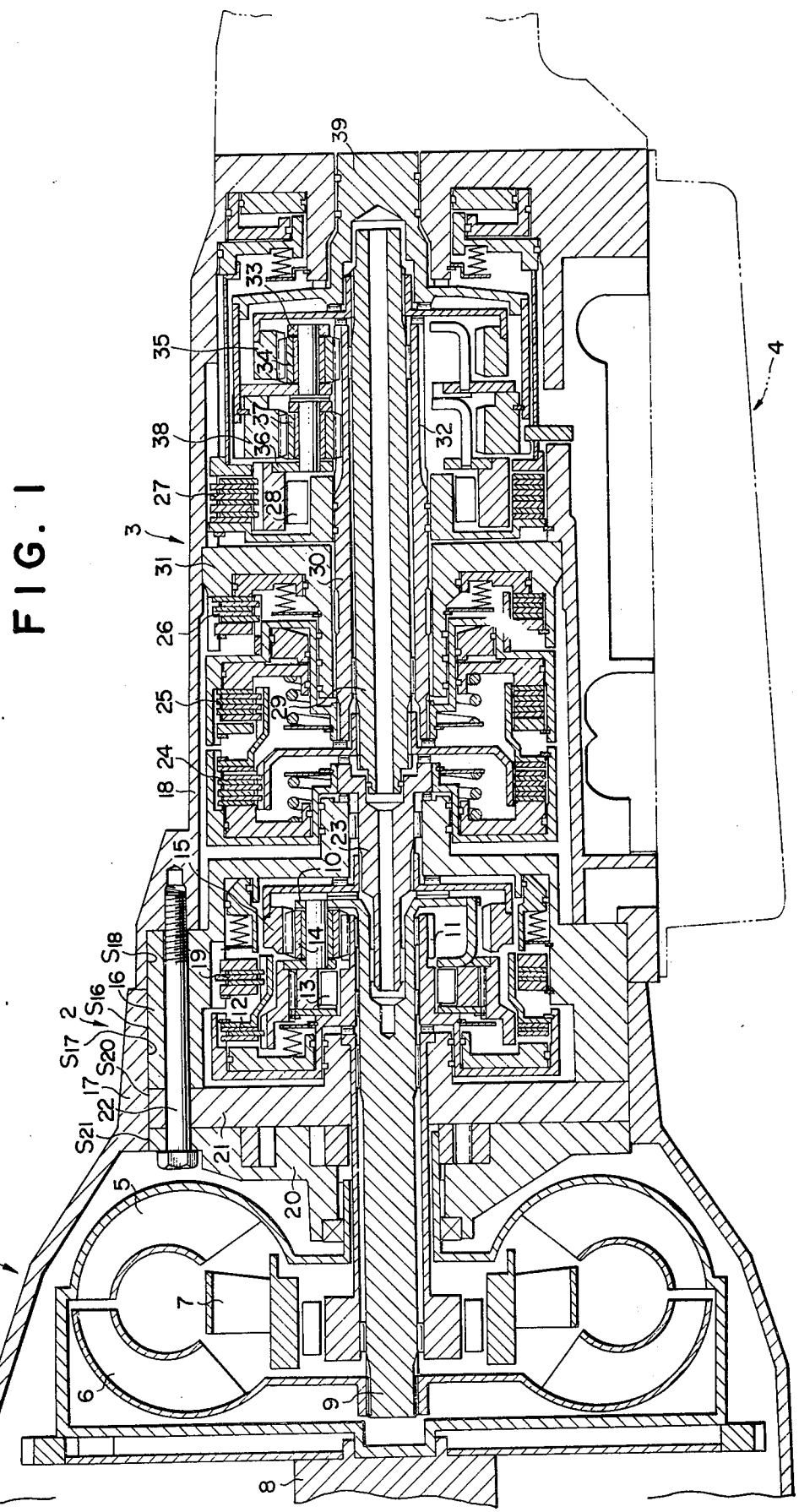
FIG. 1 is a longitudinal sectional view of an example of the automatic transmission in which the present invention is incorporated.

Referring to FIG. 1 which shows an automatic transmission in which the present invention is incorporated the automatic transmission comprises a fluid torque converter 1, an overdrive means 2, an auxiliary reduction gear means 3 for effecting three forward speed stages and one rearward speed stage and an oil pressure control means 4. The fluid torque converter 1 is of a conventional well-known type including a pump impeller 5, a turbine 6 and a stator 7. The pump impeller 5 is connected with a crank shaft 8 of the engine (not shown) while the turbine 6 is connected with a turbine shaft 9 which forms an output shaft of the fluid torque converter. This output shaft also provides an input shaft of the overdrive means 2, wherein the input shaft is connected with a carrier 10 of a planetary gear mechanism incorporated in the overdrive means. The carrier 10 rotatably supports a plurality of planetary pinions 14 which in turn are engaged with a sun gear 11 and a ring gear 15. A multi-disc clutch 12 and a one-way clutch 13 are provided between the sun gear 11 and the carrier 10 and, furthermore, a multi-disc brake 19 is provided between the sun gear 11 and an overdrive housing or case 16 enclosing the overdrive means or the planetary gear mechanism. The fluid torque converter 1 has a housing 17 which encloses therein the pump impeller 5, the turbine 6 and the stator 7. The auxiliary gear means 3 has a housing or transmission case 18 which encloses therein planetary gear mechanisms, clutches and brakes such as mentioned below. These housings 17 and 18 are joined together by connecting bolts means not shown in the figure. An oil pump is incorporated in a pump body formed by housing means 20 and 21. The overdrive case 16 and the oil pump housing 20, 21 are fastened to the transmission case 18 by bolts 22, one of which is shown in the figure.

In assembling the transmission, the overdrive case 16 and the oil pump body means 20, 21 are first fastened to the transmission case 18 by the bolts 22 and then the torque converter housing 17 is assembled thereon and joined with the transmission case 18 by the aforementioned bolt means (not shown).

In this case, when the cylindrical outer peripheral surface $S_{16}$ of the overdrive case, the cylindrical inner peripheral surface $S_{17}$ of the rear end portion of the torque converter housing, the cylindrical inner peripheral surface $S_{18}$ of the front end portion of the transmission case and the cylindrical outer peripheral surfaces $S_{20}$ and $S_{21}$ of the oil pump body are formed to be concenrically engaged with one another, the torque converter, the overdrive means and the reduction gear means are automatically aligned to the central axis of the transmission by the engagement of said cylindrical surfaces.

The ring gear 15 of the overdrive means 2 is connected with an input shaft 23 of the auxiliary gear means 3. A mutli-disc clutch 24 is provided between the input shaft 23 and an intermediate shaft 29 while a multi-disc clutch 25 is provided between the input shaft 23 and a sun gear shaft 30. A multi-disc brake 26 is provided between the sun gear shaft 30 and a support 31 fixed to the transmission case 18. The sun gear shaft 30 has a sun gear 32 integrally formed therein, said sun gear meshing with a plurality of first planetary pinions 34 (only one is shown) which mesh in turn with a ring gear 35 supported by a carrier 33 thereby forming a first set of planetary gear mechanism, while the sun gear 32 also meshes with a plurality of second planetary pinions 37 (one is shown) which mesh in turn with a ring gear 38 supported by a carrier 36, thereby forming a second set of planetary gear mechanism. The ring gear 35 of said first planetary gear mechanism is connected with the intermediate shaft 29, while the carrier 33 thereof is connected with the ring gear 38 of said second planetary gear mechanism. The combination of the carrier 33 and the ring gear 38 is connected with an output shaft 39. A multi-disc brake 27 and a one-way clutch 28 are provided between the carrier 36 of said second planetary gear mechanism and the transmission case 18.

The oil pressure control means 4 positioned below the auxiliary gear means 3 includes various change-over valve means (not shown) and is adapted to control the supply of oil pessure to the aforementioned clutches and brakes in order to accomplish various shift conditions among four forward speed stages including an overdrive stage and one rearward drive stage in accordance with the operation of a manual shift valve (not shown) and/or the balance between the engine output shaft and the vehicle speed.

Table 1 shows the operating conditions of the clutches and brakes in various shift conditions.

TABLE 1

| | Clutch/Brake Operation of the Conventional Control Means | | | | | | | |
|---|---|---|---|---|---|---|---|---|
| SHIFT POSITION | | 12 | 13 | 19 | 24 | 25 | 26 | 27 | 28 |
| FORWARD | D RANGE 1st Speed | O | * | X | O | X | X | X | * |
| | D RANGE 2nd Speed | O | * | X | O | X | O | X | X |
| | D RANGE 3rd Speed | O | * | X | O | O | X | X | X |
| | D RANGE 4th Speed (O/D) | X | X | O | O | O | X | X | X |
| | 2 RANGE 1st Speed | O | * | X | O | X | X | X | * |
| | 2 RANGE 2nd Speed | O | * | X | O | X | O | X | X |
| | L RANGE 1st Speed | O | * | X | O | X | X | O | * |
| REVERSE (R RANGE) | | O | * | X | X | O | X | O | X |

Wherein O shows that the clutch or brake is engaged; * shows that the clutch or brake is engaged in the engine drive condition while it is disengaged in the engine brake condition; and X shows that the clutch or brake is disengaged. O/D means the overdrive shift stage. In D range, the transmission is operable in 1st, 2nd, 3rd and 4th (O/D) speed stages. In the 2 range, the transmission is operable in 1st and 2nd speed stages. In L range, the transmission is fixed at 1st speed stage.

Figure 2:
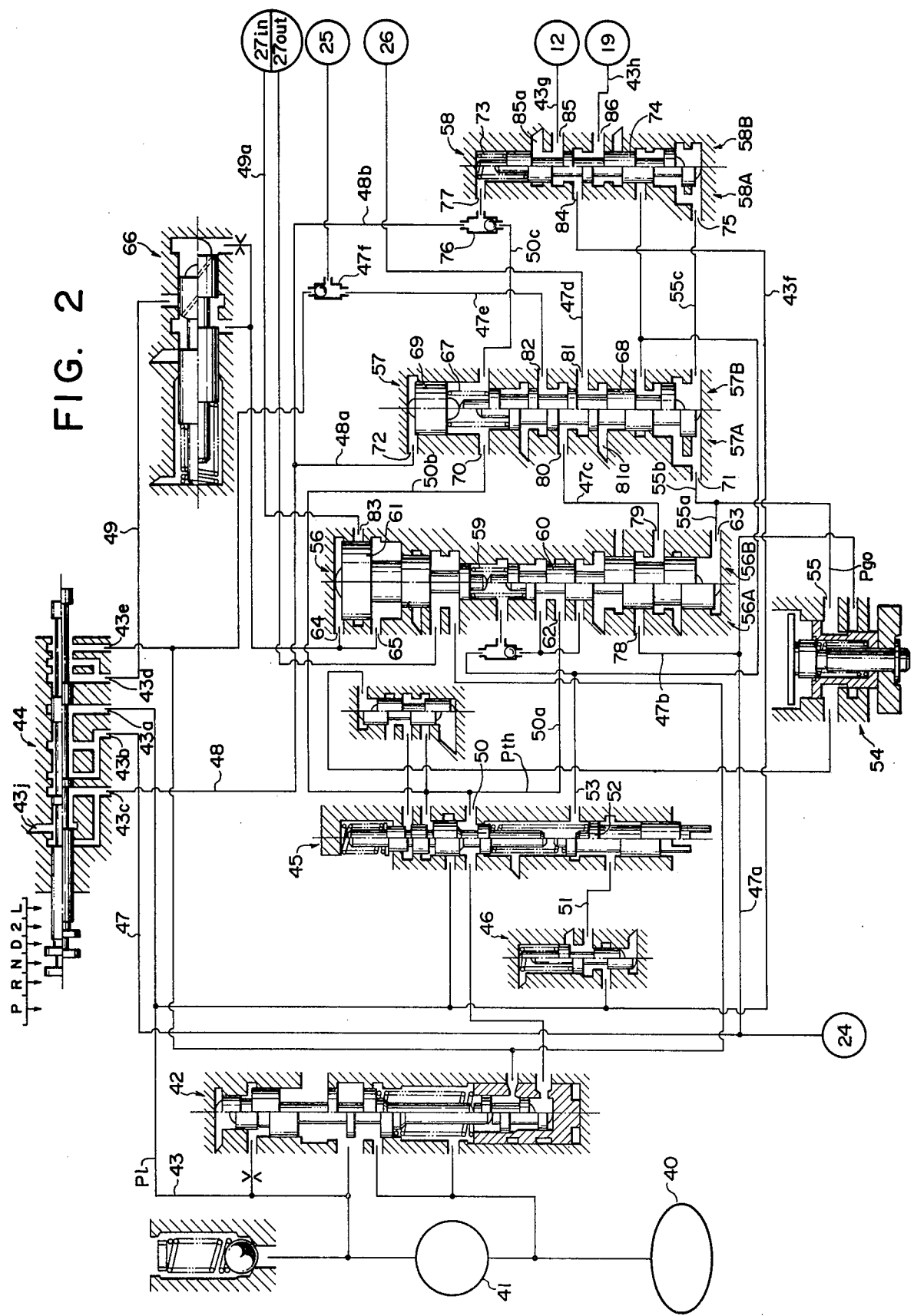
FIG. 2 is a diagram showing a general constitution of the oil pressure control means for the automatic transmission shown in FIG. 1.

FIG. 2 is a diagram showing an example of the standard constitution of the oil pressure control circuit included in the oil pressure control means 4. The oil pumped up from the oil resevoir 40 by an oil pump 41 is delivered to a line pressure regulating valve 42 and generates a line pressure $P_1$ having a predetermined regulated value in an oil passage 43. The line pressure is supplied to an manual shift valve 44, a throttle pressure regulating valve 45 and a detent pressure regulating valve 46. The manual shift valve 44 has various shift position such as parking (P), reverse (R), neutral (N), D-Range (D), 2-range (2) and L-range (L) and is adapted to deliver the line pressure supplied to its input port 43a to its output ports 43b, 43c, 43d and 43e in accordance with the shift position thereof as shown in Table 2.

TABLE 2

| Shift Position Port | P | R | N | D | 2 | L |
|---|---|---|---|---|---|---|
| 43b | | | | O | O | O |
| 43c | | | | | O | O |
| 43d | O | O | | | | O |
| 43e | | O | | | | |

The throttle pressure regulating valve 45 generates a throttle pressure $P_{th}$ at its output port 50 in accordance with the stepping-in amount of the accelerating pedal or the opening of the intake throttle valve. The detent pressure regulating valve 46 generates a detent pressure as its output passage 51, said detent pressure being lower than the line pressure by a predetermined value and supplied to speed shift valves for maintaining them at particular shift positions as explained hereinunder through a valve 52 incorporated in the throttle pressure regulating valve and adapted to establish communication therethrough when the accelerating pedal has been stepped in beyond a predetermined amount and through an oil passage 53. A passage 47 connected to the port 43b of the manual shift valve 44 is led to the clutch 24 (Forward Clutch), and a passage 47a branched from a middle portion thereof it led to a governor valve 54. The governor valve generates a governor pressure $P_{go}$ corresponding to the vehicle speed at its output port 55.

The valves designated by 56 and 57 are a 1-2 speed shift valve and a 2-3 speed shift valve, respectively. 58 designates an overdrive control valve. The 1-2 speed shift valve 56 comprises two valve elements 60 and 61 axially opposing to each other with interposition of a compression coil spring 59. The valve element 60 is shifted between the lower shift position shown by 56A and the upper shift position shwon by 56B due to the balance of the sum of the force applied by the spring 59 and the downward force (as seen in the figure) applied by the throttle pressure $P_{th}$ supplied to a port 62 through a passage 50a and the upward force (as seen in the figure) applied by the governor pressure $P_{go}$ supplies to a port 63 through a passage 55a. Ports 64 and 65 of the 1-2 speed shift valve 56 are supplied with the line pressure which appears at the output 43d of the manual shift valve 44 when it is shifted to L-range through a passage 49 and a low modulator valve 66 under the regulation applied thereby so that when the pressure is supplied to these ports, the valve element 61 is shifted downward in the figure and compulsorily maintains the valve element 60 at its lower shift position 56A.

Similarly, the 2-3 speed shift valve 57 comprises two valve elements 68 and 69 axially opposing to each other with interposition of a compression coil spring 67. The valve element 68 is also shifted between the lower shift position designated by 57A and the upper shift position designated by 57B due to the balance of the sum of the downward force applied by the spring 67 and the downward force applied by the throttle pressure $P_{th}$ supplied to a port 70 through a passage 50b and the upward force applied by the governor pressure $P_{go}$ supplied to a port 71 through a passage 55b. A port 72 is supplied with the line pressure which appears at the output port 43c of the manual shift valve 44 when it is shifted to 2-range through passages 48 and 48a so that when the pressure is supplied to the port 72, the valve element is shifted downward and compulsorily maintains the valve element 68 at the lower shift position shown by 57A.

The overdrive control valve 58 comprises a valve element 74 urged downward in the figure by a compression coil spring 73. The valve element 74 is applied a governor pressure $P_{go}$ at its lower end, said governor pressure being supplied at a port 75 through a passage 55c. In addition to the downward force applied by the spring 73, the valve element 74 is selectively applied either the throttle pressure $P_{th}$ or the line pressure which appears in the output port 43c of the manual shift valve 44 when it is shifted to 2-range, said throttle pressure being supplied through a passage 50c, a shuttle valve 76 and a port 77 while the line pressure is supplied through a passage 48b, the shuttle valve 76 and the port 77. Due to the balance of the sum of the spring force and the force applied by the throttle pressure or the line pressure and the upward force applied by the governor pressure, the valve element 74 is shifted between the lower shift position designated by 58A and the upper shift position designated by 58B.

The port 78 of the 1-2 speed shift valve 56 is supplied with the line pressure through a passage 47b, when the manual shift valve is shifted to D-range. If the 1-2 speed shift valve is in its upward shift position shown by 56B, the line pressure supplied to the port 78 is transmitted to a port 79, wherefrom the pressure is conducted through a passage 47c to a port 80 of the 2-3 speed shift valve 57. When the 2-3 speed shift valve is in its downward shift position as shown by 57A, the line pressure is transmitted from the port 80 to a port 81, wherefrom the pressure is conducted through a passage 47d to the brake 26 (second brake). When the 2-3 speed shift valve is in the upward speed shift position, the oil pressure supplied to the port 80 is transmitted to a port 82, wherefrom the pressure is conducted through a passage 47e and a shuttle valve 47f to the clutch 25 (direct Clutch). When the manual speed shift valve 44 is shifted to L-range, the oil pressure appeared at the output port 43d is conducted through the low modulator valve 66, the ports 64 and 83 of the 1-2 speed shift valve 56 and a passage 49a to the inside of the brake 27 (first brake). The outside of the brake 27 is supplied with the oil pressure which appears in the output port 43e of the manual shift valve 44 when it is shifted to R position.

The port 84 of the overdrive control valve 58 is supplied with the line pressure through the passages 43 and 43f. When the overdrive control valve is in the lower shift position such as shown by 58A, the line pressure supplied to the port 84 is transmitted to a port 85, wherefrom the pressure is conducted through a passage 43g to the clutch 12 of the overdrive means. On the contrary, if the overdrive control valve is in the upper shift position such as shown by 58B, the pressure is transmitted from the port 84 to a port 86, wherefrom the pressure is conducted through a passage 43h to the brake 19 of the overdrive means.

The operation of an oil pressure control circuit such as shown in FIG. 2 is conventionally well known in the art. However, for the sake of convenience, the operation will be summarized in the following:

D RANGE

When the manual shift valve 44 is shifted to D Range, the line pressure appears in the passage 47 and the pressure is supplied directly to the clutch 24. Under this condition, if the vehicle is standing or is running at a low speed, the governor pressure $P_{go}$ generated by the governor valve 54 is so low that the 1-2 speed shift valve 56, the 2-3 speed shift valve 57 and the overdrive control valve 58 are maintained in the lower shift positions such as designated by 56A, 57A and 58A, respectively, whereby the oil pressure supplied through the passage 47b is intercepted at the port 78 and is not transmitted to the subsequent passages including the direct clutch 25 and the second brake 26. The oil pressure conducted through the passage 43f to the overdrive control valve 58 is supplied to the clutch 12 of the overdrive means. In this condition, therefore, the overdrive mechanism is locked and the reduction gear means is in the 1st speed stage.

Starting from this condition, when the vehicle speed gradually increases, the governor pressure $P_{go}$ gradually increases and, at a certain vehicle speed, the 1-2 speed shift valve 56 is shifted to 56B position, whereby the line pressure is supplied to the port 79, wherefrom the pressure is conducted through the ports 80 and 81 of the 2-3 speed shift valve 57 and the passage 47d to the second brake 26 which is then engaged. In this condition the transmission is shifted to the 2nd speed stage.

When the vehicle speed further increases, the 2-3 speed shift valve 57 is shifted to the 57B position. The oil pressure supplied to the port 80 is then transmitted to the port 82, wherefrom the pressure is conducted through the passage 47e and the shuttle valve 47f to the direct clutch 25 which is then engaged. On the other hand, the oil pressure which has been supplied to the brake 26 is now exhausted through the passage 47d, the port 81 and a drain port 81a. In this condition, the transmission is shifted to the 3rd speed stage, i.e., direct connection.

When the vehicle speed further increases, the overdrive control valve 58 is also shifted to the 58B position, whereby the oil pressure supplied to the port 84 is now switched from the port 85 to the port 86, wherefrom the pressure is conducted through the passage 43h to the brake 19, while the pressure which has been supplied to the clutch 12 is now exhausted through the passage 43g, the port 85 and a drain port 85a. In this condition, the overdrive means 2 is put in operation and the transmission operates in the overdrive stage.

In the above explanation, for the sake of convenience, the changing over of the speed stages has been explained in relation to the increase of the vehicle speed. However in the actual operation, the changing over of the speed stages is effected depending upon the balance of the governor pressure and the throttle pressure oppositely applied to the valve element of the individual speed shift valves and, therefore, the shift point varies not only in accordance with the vehicle speed, but also in accordance with the stepping-in amount of the accelerating pedal. When the vehicle speed gradually lowers, the overdrive control valve 58, the 2-3 speed shift valve 57 and the 1-2 speed shift valve 56 are successively shifted from 58B to 58A, 57B to 57A and 56B to 56A, respectively, in the reversed manner thereby successively establishing lower speed stages.

2 RANGE

When the manual shift valve 44 is shifted to 2 range, the line pressure appears at the output port 43b as well as at the output port 43c, wherefrom the pressure is conducted through the passages 48a and 48b to the port 72 of the 2-3 speed shift valve 57 and the port 77 of the overdrive control valve, respectively, driving the valve element 69 and 74 downward to maintain the 2-3 speed shift valve and the overdrive control valve at shift positions 57A and 58A. In this condition, therefore, the overdrive mechanism is maintained in the local condition and the reduction gear mechanism operates either in the 2nd speed stage or in the 1st speed stage.

L RANGE

When the manual shift valve 44 is shifted to L range, the line pressure also appears at the output port 43d, wherefrom the pressure is conducted through the low moderator valve 66 to the ports 64 and 65 of the 1-2 speed shift valve 56, driving the valve element 61 downward in the figure to maintain the 1-2 speed shift valve in the lower shift position 56A. In this condition, the automatic transmission is maintained in the 1st speed stage.

Now, let us assume that the vehicle is running in the 3rd speed stage and that now the automatic transmission is shifted down from the 3rd speed stage to the 2nd speed stage by stepping in the accelerating pedal. In this 3-2 downshift, the clutch 25 is disengaged while the brake 26 is engaged in a manner such that the so-called clutch-to-clutch shifting is effected. In this case, it is very important that the timing of exhausting and supplying the oil pressure from and to the individual friction engaging means is judiciously regulated for accomplishing a smooth downshift performance.

Figure 3:
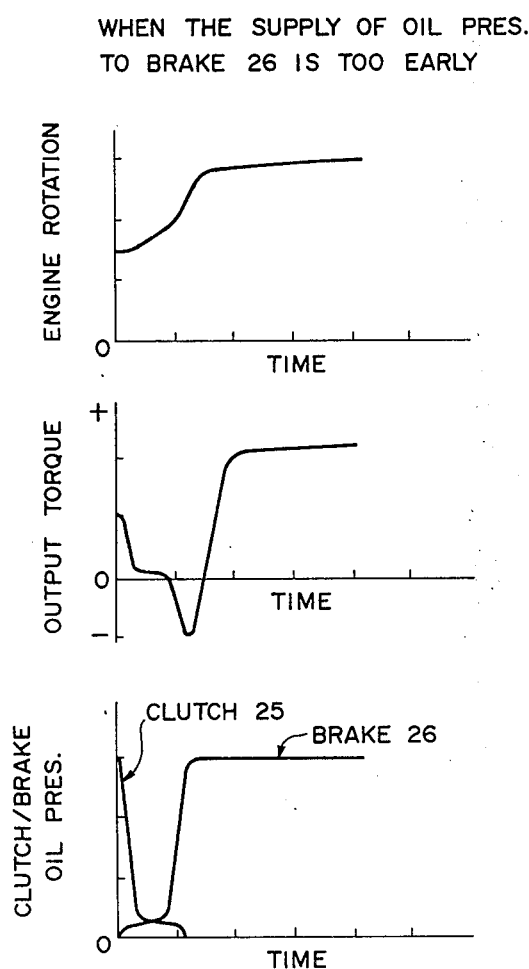
FIG. 3 is two graphs showing the variation performances of the torque of the output shaft and the rotational speed of the engine of 3-2 down shifting effected by an oil pessure control means having a conventional constitution such as shown in FIG. 2, wherein the timing of supplying oil pressure is not proper.
Figure 3:
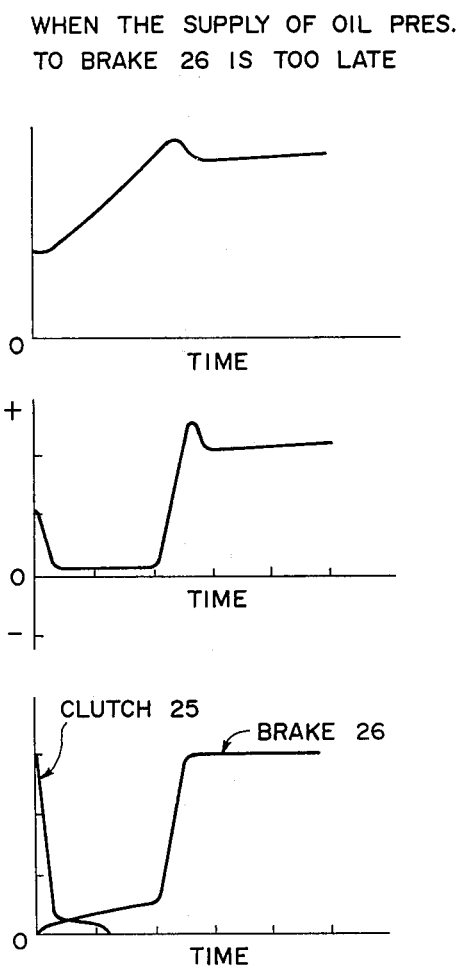

Referring to FIG. 3, the leftside figure (a) shows the changes of the output torque and the rotational speed of the engine in relation to the changes of the oil pressure in the clutch and brake for the case wherein the supply of oil pressure to the brake 26 is too early. When the brake 26 is engaged before the engine gains the rotational speed suitable for the 2nd speed stage due to the disengagement of the clutch 25, the theoretical rotational speed of the input shaft of the reduction gear means in the 2nd speed stage determined from the actual running speed of the vehicle exceeds the actual rotational speed of said input shaft or the turbine 6 of the torque converter, and accordingly, it happens that the turbine 6 rotates faster than the impeller 5 which rotates at the engine rotational speed. Consequently, the driving torque is reversedly transmitted through the transmission towards the engine, whereby a negative torque appears in the output shaft of the transmission. This causes a very uncomfortable drive feeling.

By contrast, FIG. 3 (b) shows the case wherein the supply of oil pressure to the brake 26 is too late. In this case, the brake 26 is not yet engaged even when the engine has already gained the rotational speed suitable for the 2nd speed stage due to the disengagement of the clutch 25, and, therefore, the engine blows up to a higher rotational speed and, thereafter, at last the brake 26 is engaged. Furthermore, since the engine is abruptly decelerated to the lower rotational speed suitable for the 2nd speed stage at the instant when the brake 26 is engaged, a large positive torque appears in the output shaft. This also causes an uncomfortable drive feeling.

The proper amount of change of the rotational speed of the engine required for a smooth downshifting from the 3rd speed stage to the 2nd speed stage varies generally in proportion to the vehicle speed, while the vehicle speed range in which the 3-2 downshifting can be effected by the stepping-in of the accelerating pedal generally occupies a relatively wide area in the well known automatic speed shift diagrams. Therefore, if the automatic transmission does not incorporate a control mechanism which regulates the timing for the supply of oil pressure to the brake 26 in accordance with the vehicle speed, a comfortable shift feeling is not always ensured.

In dealing with this problem, the present invention proposes to accomplish the aforementioned complicated control in a simple but positive manner in the automatic transmission incorporating the planetary gear type overdrive means by utilizing the overdrive means.

In accordance with the present invention, it is proposed that when for example the downshifting from 3rd speed stage to 2nd speed stage is effected, the clutch 12 in the overdrive means is disengaged while the brake 26 is supplied with the oil pressure before the engine gains the rotational speed suitable for the 2nd speed stage. In this case, due to the engagement of the brake 26 effected before the engine gains the rotational speed suitable for the 2nd speed stage, the ring gear 15 of the overdrive means 2 will rotate faster than the turbine of the torque converter and this over-run is allowed for since the clutch 12 is disengaged while the one-way clutch 13 is free to be driven in the reverse rotational direction. Therefore, it does not happen that the turbine drives the engine and it is avoided that a negative torque appears in the output shaft as explained with reference to FIG. 3 (a). When the engine has gained the proper rotational speed, the one-way clutch 13 is automatically engaged to transmit the torque. In this manner, a comfortable downshifting is accomplished.

Figure 4:
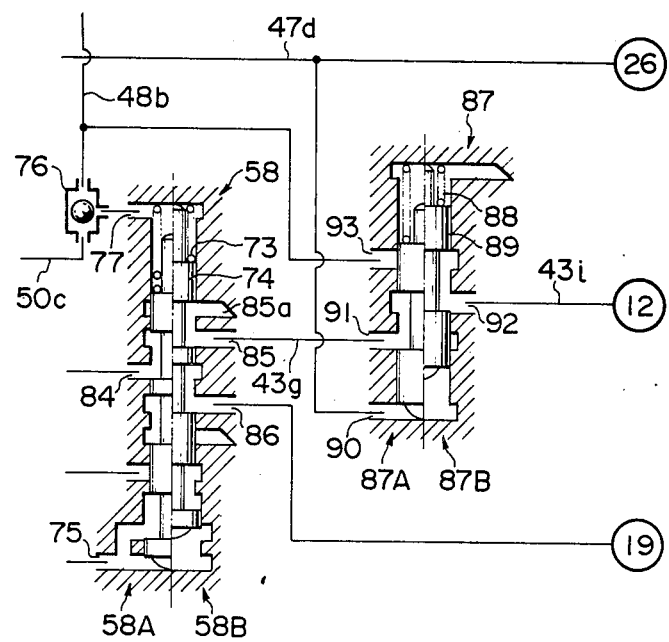
FIG. 4 is a partial diagram showing the essential portion of the embodiment of the oil pressure control means of the present invention.

FIG. 4 is a partial diagram of the oil pressure circuit showing a first embodiment of the present invention and shows the modification effected in the region of the oil pressure circuit including the overdrive control valve 58 at the right end portion of the oil pressure circuit shown in FIG. 2. In this embodiment, a change-over valve 87 is incorporated in a middle portion of the passage 43g extending from the overdrive control valve 58 to the clutch 12. The valve 87 comprises a valve element 89 urged downward in the figure, by a compression coil spring 88. When the oil pressure is not supplied to a port 90 connected to the passage 47d, the valve element 89 is positioned at the lower shift position designated by 87A, while the valve element is shifted to the upper shift position designated by the 87B when the oil pressure is supplied to the port 90. In the shift position 87A, the oil pressure supplied to the port 91 through the passage 43g is transmitted to a port 92, wherefrom the pressure is conducted through a passage 43i to the clutch 12, whereas in the shift position 87B the port 92 is isolated from the port 91 and is connected to a port 93 which is connected with the passage 48.

When the downshifting is effected from the 3rd speed stage to the 2nd speed stage in this embodiment, the second brake may be supplied with oil pressure simultaneously when the oil pressure of the direct clutch 25 is exhausted. In this instance, the oil pressure supplied to the brake 26 through the passage 47d is simultaneously supplied to the port 90 of the change-over valve 87 and drives the valve element 89 upward to shift the change-over valve to the upper shift position 87B. Therefore, the supply of oil pressure from the port 91 to the port 92 is intercepted while the port 92 is connected to the port 93 and the passage 48b. Since in this instance the manual shift valve 44 is shifted in D range, the passage 48 is exhausted through the drain port 43j thereof, and, accordingly, the pressure which has been applied to the clutch 12 of the overdrive mechanism is exhausted through the port 93 and the passages 48b and 48, whereby the clutch 12 is disengaged. Therefore, when the second brake 26 is immediately supplied with the oil pressure and is thereby engaged thereby establishing the 2nd speed stage in the reduction gear means 3, the transmission of the torque from the reduction gear means to the torque converter is relieved by the overdrive means and the engine breaking does not occur. When the engine has gained the rotational speed after a little while, the one-way clutch is automatically engaged and, thereafter, the 2nd speed stage driving is maintained by the operation of the one-way clutch. The operational condition of the clutches and brakes in the embodiment shown in FIG. 4 is shown in Table 3.

TABLE 3

Clutch/Brake Operation of the First Embodiment

| SHIFT POSITION | | 12 | 13 | 19 | 24 | 25 | 26 | 27 | 28 |
|---|---|---|---|---|---|---|---|---|---|
| FORWARD | D RANGE 1st Speed | O | * | X | O | X | X | X | * |
|  | D RANGE 2nd Speed | X | * | X | O | X | O | X | X |
|  | D RANGE 3rd Speed | O | * | X | O | O | X | X | X |
|  | D RANGE 4th Speed (O/D) | X | X | O | O | O | X | X | X |
|  | 2 RANGE 1st Speed | O | * | X | O | X | X | X | * |
|  | 2 RANGE 2nd Speed | O | * | X | O | X | O | X | X |
|  | L RANGE 1st Speed | O | * | X | O | X | X | O | * |
| REVERSE (R RANGE) | | O | * | X | X | O | X | O | X |

In Table 3, the condition is different from that shown in Table 1, in that the clutch 12 is disengaged in D range 2nd speed stage. As shown in Table 3, in 2 range 2nd speed stage, the line pressure which appears in the passage 48b is conducted through the port 93 and 92 to the clutch 12, which is then engaged, whereby the engine braking is effected when required.

Figure 5:
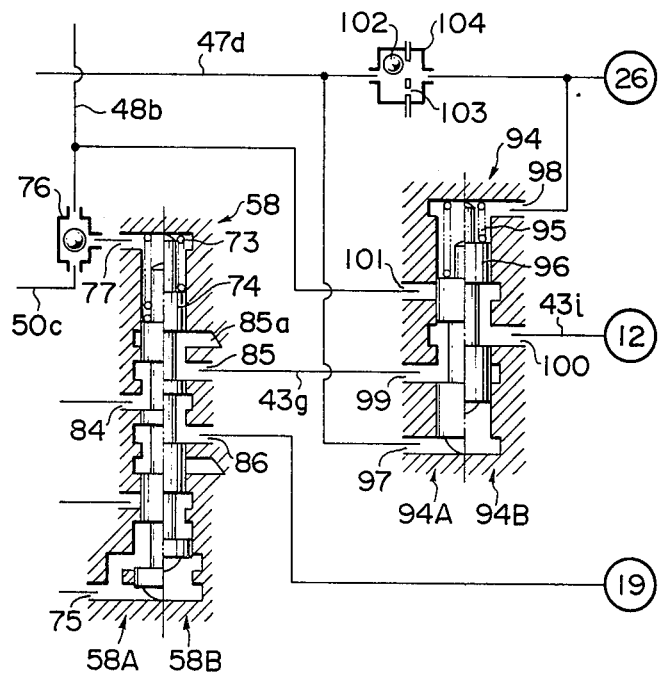
FIG. 5 is a view similar to FIG. 4 showing a second embodiment of the present invention.

FIG. 5 is a view similar to FIG. 4 showing a second embodiment of the present invention. In this embodiment, a change-over valve 94 similar to the changeover valve 87 in the embodiment shown in FIG. 4 is incorporated in a middle portion of the passage 43g extending from the overdrive control valve 58 to the clutch 12. The change-over valve 94 comprises a valve element 96 urged downward in the figure by a compression coil spring 95. The valve element is shifted between the lower shift position 94A and the upper shift position 94B due to the balance of the forces effected by the oil pressure applied to ports 97 and 98. In the 94A shift position, the oil pressure supplied to the port 99 through the passage 43g is transmitted to a port 100, wherefrom the pressure is conducted through the passage 43i to the clutch 12. By contrast, when the change-over valve 94 is shifted to the position 94B, the port 100 is isolated from the port 99 and is connected to a port 101 which is connected to the passage 48b.

In this embodiment, the passage 47d incorporates therein a flow sensing means 104 composed of a parallel combination of a check valve 102 and a throttling element 103, the upstream side of the flow sensing means being connected to the port 97 while the downstream side of the flow sensing means is connected to the port 98.

Figure 6:
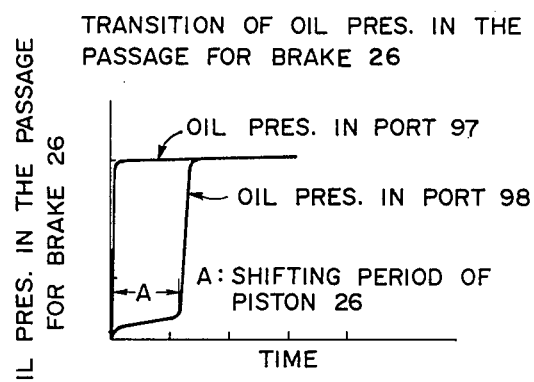
FIG. 6 is two graphs showing the operational performances of the embodiment shown in FIG. 5.
Figure 6:
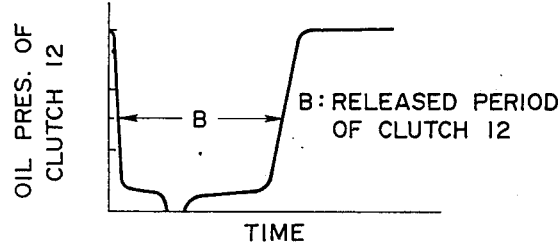

The manner of operation of this second embodiment is as shown in FIG. 6. When the oil flow is generated through the passage 47d toward the second brake 26 in the downshifting from the 3rd speed stage to the 2nd speed stage, there occurs a difference between the oil pressure supplied to the port 97 and that supplied to the port 98 within the period A in which the piston of the brake 26 moves in the co-operating cylinder as shown in FIG. 6 (a). As long as the pressure difference exists, the change-over valve 94 is shifted to the shift position 94B so that the port 100 is isolated from the port 99. When the change-over valve 94 is returned to the shift position 94A after the lapse of time A, oil begins to flow through the passage 43i toward the clutch 12 and, as a result, the clutch 12 is again engaged when a time B longer than the time A has lapsed, as shown in FIG. 6(b). The clutch 12 is disengaged for this time B, whereby the occurance of the engine braking due to downshifting is avoided. The operating conditions of the clutches and brakes in the 2nd embodiment in the normal operation of the vehicle are the same as those shown in Table.1.

Figure 7:
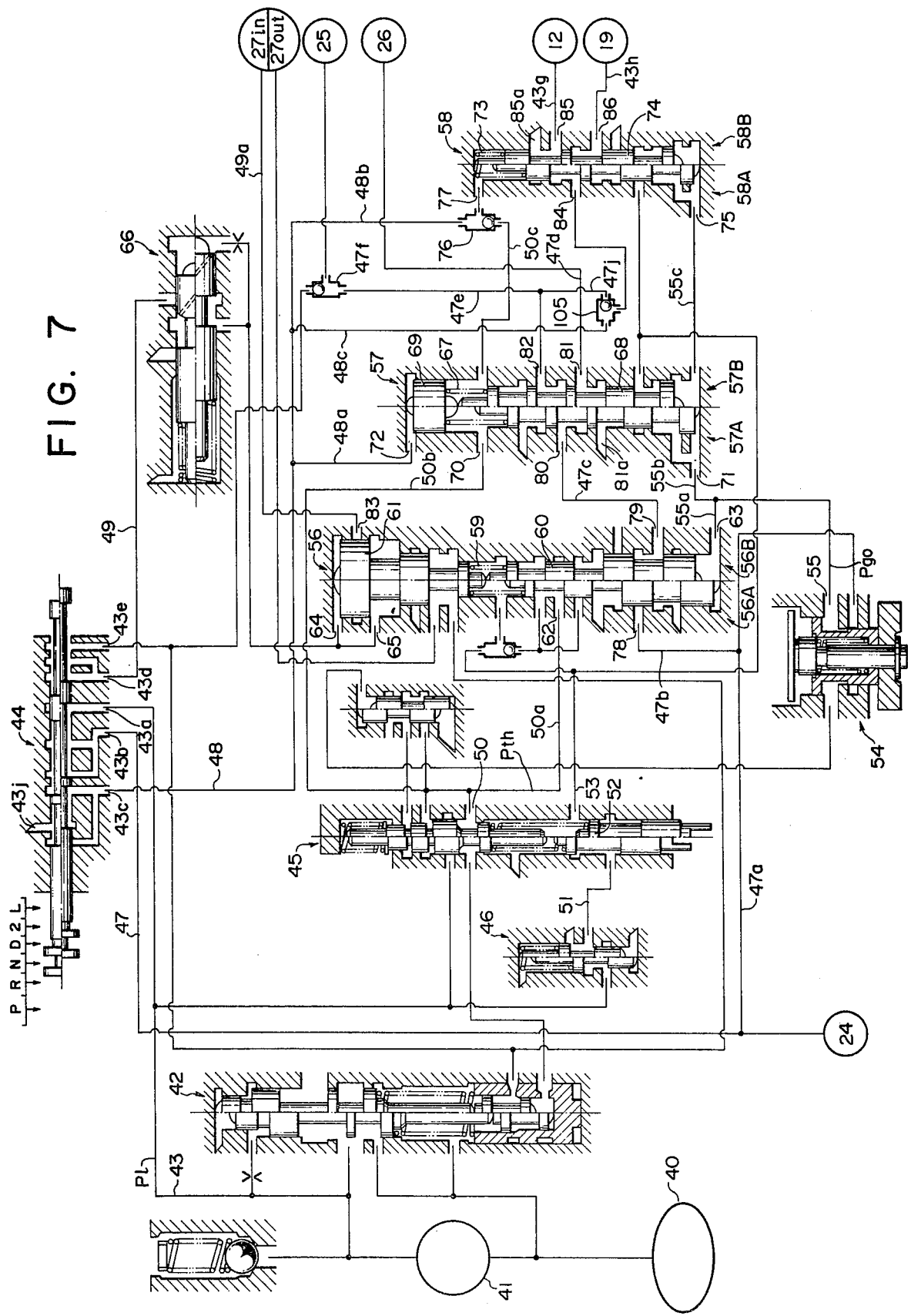
FIG. 7 is a view similar to FIG. 2 showing still another embodiment of the present invention; and, FIG. 8 is three graphs showing the transitional performance of the downshifting accomplished by the present invention.

FIG. 7 is a view similar to FIG. 2 showing a third embodiment of the present invention. In FIG. 7, the portions corresponding to those shown in FIG. 2 are designated by the same reference numbers. Furthermore, since the operation of the conventional part of the oil pressure circuit is the same as that explained with referencence to FIG. 2, the explanation for the conventional part will be omitted for the purpose of simplicity. In this third embodiment, the line pressure to be supplied to the port 84 of the overdrive control valve 58 is the pressure derived from the passage 47e which supplies the oil pressure from the port 82 of the 2-3 speed shift valve 57 to the clutch 25, the derived pressure being conducted through a passage 47j and a shuttle valve 105. The other side of the shuttle valve 105 is supplied with the pressure which appears at the output port 43c of the manual shift valve 44 when it is shifted to 2 range, said pressure being conducted through the passages 48, 48c. In this arrangement, in the downshifting from the 3rd to 2nd speed stage, the exhaust of the oil pressure for the direct clutch 25 also causes the exhaust of the oil pressure for the clutch 12 thereby effecting the same operation of disengaging the clutch 12 of the overdrive means in the 3-2 downshifting in the same manner as in the former embodiment.

Table 4 shows the operational conditions of the clutches and brakes in this third embodiment.

TABLE 4

| | Clutch/Brake operation of the third embodiment | | | | | | | | |
|---|---|---|---|---|---|---|---|---|---|
| | SHIFT POSITION | 12 | 13 | 19 | 24 | 25 | 26 | 27 | 28 |
| FORWARD | 1st Speed | X | * | X | O | X | X | X | * |
| | D RANGE 2nd Speed | X | * | X | O | X | O | X | X |
| | 3rd Speed | O | * | X | O | O | X | X | X |
| | 4th Speed (O/D) | X | X | O | O | O | X | X | X |
| | 2 RANGE 1st Speed | O | * | X | O | X | X | X | * |
| | 2nd Speed | O | * | X | O | X | O | X | X |
| | L RANGE 1st Speed | O | * | X | O | X | O | O | * |
| | REVERSE (R RANGE) | O | * | X | X | O | X | O | X |

Figure 8:
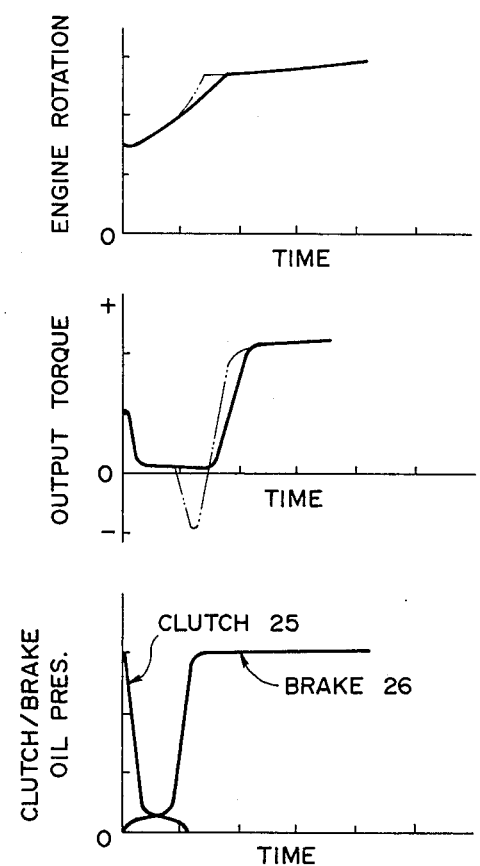

FIG. 8 is three showing the variation performances of the oil pressure for the clutch and brake, the output torque and the engine rotational speed in the 3-2 downshifting effected by the oil pressure control means of the present invention. As shown in the figure, the supply of oil pressure to the brake 26 is relatively early in relation to the exhaust of oil pressure from the clutch 25. If this timing of exhaust and supply is employed for the conventional oil pressure control means, the output torque will change in the manner such as shown by the phantom line in the figure, thereby temporally showing a negative value thereby causing the engine braking condition which causes an abrupt increase of the rotational speed of the engine such as shown by the phantom line in the figure. However, in accordance with the present invention, the disengagement of the clutch 12 for the downshifting excludes the occurrance of the engine braking condition and ensures the smooth rising up of the rotational speed of the engine after the disengagement of the direct clutch 25 as shown by the solid line in the figure until the one-way clutch 13 is automatically engaged when the rotational speed of the engine has reached the value suitable for the 2nd speed stage. In this instance, the output torque also transfers smoothly without causing any negative value as shown by the solid line in the figure.

Although the downshift from the 3rd speed stage to the 2nd speed stage has been explained, it will be apparent that the same improvement is obtained when the transmission is shifted from the overdrive condition directly down to the 2nd speed stage.

Furthermore, although the invention has been shown and described with respect to some preferred embodiments thereof, it should be understood by those skilled in the art that various changes and omissions of the form and detail thereof may be made therein without departing from the scope of the invention.

We claim:

1. An oil pressure control means for an automatic transmission which comprises a fluid torque converter, an overdrive means of a planetary gear type, said overdrive means comprising a planetary gear mechanism, a plurality of friction engaging means and a one-way clutch and adapted to allow the output shaft thereof to run over the input shaft thereof due to the disengagement of said one-way clutch in the reverse rotational direction thereof when one of said friction engaging means arranged in parallel to said one-way clutch is disengaged, and a reduction gear means including a reduction gear mechanism and a plurality of friction engaging means and adapted to effect various gear stages, said oil pressure control means comprising a source of oil pressure, a line pressure regulating valve which generates a line pressure from the oil pressure of said source, a throttle pressure regulating valve which generates a throttle pressure corresponding to the throttle opening, a governor valve which generates a governor pressure corresponding to the vehicle speed, a manual shift valve for shifting speed ranges, a speed shift valve or valves which change over the supply of oil pressure to said friction engaging means of said reduction gear mechanism depending upon the balance of said throttle pressure and said governor pressure, an overdrive control valve which changes over the supply of oil pressure to said friction engaging means of said overdrive means depending upon the balance of throttle pressure and said governor pressure, and a change-over valve which intercepts the supply of oil pressure to said one friction engaging means of said overdrive means in response to the supply of oil pressure to one of said friction engaging means of said reduction gear means which accomplishes a low speed stage.

2. The oil pressure control means of claim 1, wherein said change-over valve comprises a valve element and a spring means which drives said valve element toward a first shift position, said valve element being shifted to a second shift position where it intercepts the supply of oil pressure to said one friction engaging means of said overdrive means against said spring means by the oil pressure supplied to said one friction engaging means of said reduction gear means.

3. The oil pressure control means of claim 1, wherein said change-over valve comprises a valve element and a spring means which biases said valve element toward a first shift position, said valve element being shifted to a second shift position where it intercepts the supply of oil pressure to said one friction engaging means of said overdrive means against said spring means by a pressure difference generated by the flow of oil caused by the supply of oil pressure to said one friction engaging means of said reduction gear means.

4. The oil pressure control means of claim 1, wherein said change-over valve connects one friction engaging means of said overdrive means to an output port of said manual shift valve where the oil pressure appears when said manual shift valve is shifted to the range of said low speed stage while said change-over valve intercepts the supply of oil pressure to said one friction engaging means.

5. An oil pressure control means for an automatic transmission which comprises a fluid torque converter, an overdrive means of a planetary gear type, said overdrive means comprising a planetary gear mechanism, a plurality of friction engaging means and a one-way clutch and adapted to allow the output shaft thereof to run over the input shaft thereof due to the disengagement of the said one-way clutch in the reverse rotational direction thereof when one of said friction engaging means arranged in parallel to said one-way clutch is disengaged, and a reduction gear means including a reduction gear mechanism and a plurality of friction engaging means and adapted to effect various gear stages, said oil pressure control means comprising a source of oil pressure, a line pressure regulating valve which generates a line pressure from the oil pressure of said source, a throttle pressure regulating valve which generates a throttle pressure corresponding to the throttle opening, a governor valve which generates a governor pressure corresponding to the vehicle speed, a manual shift valve for shifting speed ranges, a speed shift valve or valves which change over the supply of oil pressure to said friction engaging means of said reduction gear mechanism depending upon the balance of said throttle pressure and said governor pressure, an overdrive control valve which changes over the supply of oil pressure to said friction engaging means of said overdrive means depending upon the balance of said throttle pressure and said governor pressure, and an oil passage means which exhausts oil pressure from said one friction engaging means of said overdrive means in accordance with the exhaust of oil pressure from one of said friction engaging means of said reduction gear means which accomplishes a high speed stage.

6. The oil pressure control means of claim 5, wherein said oil passage means comprises a shuttle valve which supplies either the oil pressure supplied to said one friction engaging means of said reduction gear means or the oil pressure which appears at an output port of said manual shift valve when said manual shift valve is shifted to a low speed stage to said one friction engaging means of said overdrive means.

* * * * *